(12) United States Patent
Sumcad et al.

(10) Patent No.: US 7,289,024 B2
(45) Date of Patent: Oct. 30, 2007

(54) METHOD AND SYSTEM FOR SENDING PRE-SCRIPTED TEXT MESSAGES

(75) Inventors: Anthony J. Sumcad, Southfield, MI (US); Shpetim S. Veliu, Livonia, MI (US); Hitan S. Kamdar, Utica, MI (US)

(73) Assignee: General Motors Corporation, Detroit, MI (US)

( * ) Notice: Subject to any disclaimer, the term of this patent is extended or adjusted under 35 U.S.C. 154(b) by 476 days.

(21) Appl. No.: 10/922,013

(22) Filed: Aug. 19, 2004

(65) Prior Publication Data

US 2006/0038674 A1 Feb. 23, 2006

(51) Int. Cl.
*H08B 1/08* (2006.01)
*H04Q 7/00* (2006.01)

(52) U.S. Cl. ............... 340/539.17; 340/438; 340/425.5; 455/428; 455/404.2

(58) Field of Classification Search ............ None
See application file for complete search history.

(56) References Cited

U.S. PATENT DOCUMENTS

| | | | |
|---|---|---|---|
| 5,630,207 A * | 5/1997 | Gitlin et al. | 340/7.23 |
| 6,810,323 B1* | 10/2004 | Bullock et al. | 701/206 |
| 6,871,067 B2* | 3/2005 | Clark et al. | 455/428 |
| 6,956,831 B1* | 10/2005 | Mahr | 370/310 |
| 7,071,821 B2* | 7/2006 | Adamczyk et al. | 340/539.18 |
| 2003/0078033 A1* | 4/2003 | Sauer et al. | 455/412 |
| 2003/0083060 A1* | 5/2003 | Menendez | 455/423 |
| 2004/0142678 A1* | 7/2004 | Krasner | 455/404.2 |
| 2004/0185855 A1* | 9/2004 | Storm et al. | 455/445 |

\* cited by examiner

*Primary Examiner*—Benjamin C. Lee
*Assistant Examiner*—Son Tang

(57) ABSTRACT

A system employing a telematics unit and a telematics call center. The telematics unit includes a first module and a first set of at least one pre-scripted text message, and the telematics call center includes a second module and a second set of at least one pre-scripted text message. The modules operate to selectively establish a communication between telematics unit and telematics call center involving at least one of the first set of at least one pre-scripted text message and the second set of at least one pre-scripted text message.

11 Claims, 7 Drawing Sheets

PRE-SCRIPTED
TEXT MESSAGES
220

"SEND HELP"
"CAN YOU HEAR ME"
"YES"
"NO"

NOTE: PROVIDE OTHERS, IF ANY

PRE-SCRIPTED
TEXT MESSAGES
320

"HELP IS ON THE WAY"
"YES"
"NO"

NOTE: PROVIDE OTHERS, IF ANY

FIG. 4

METHOD AND SYSTEM FOR SENDING PRE-SCRIPTED TEXT MESSAGES

FIELD OF THE INVENTION

The present invention generally relates to communications within a mobile vehicle communication systems. The present invention specifically relates to transmission and reception of pre-scripted text messages using telematics.

BACKGROUND OF THE INVENTION

Currently, a vehicle occupant may not be able to verbally communicate with an advisor at a call center in an emergency situation, such as, for example, a traffic collision, the vehicle being submerged in water, an airbag deployment, an emergency button press, and a backup battery mode. In one instance, the vehicle occupant may be physically unable to verbally communicate with the advisor, such as, for example, a mute vehicle occupant. In another instance, the transmit feature of a telematics microphone embedded within a vehicle may be malfunctioning, the receive feature of a telematics speaker embedded within a vehicle may be malfunctioning, and/or an in-vehicle mobile phone may be malfunctioning. Nevertheless, it is important that a vehicle occupant in an emergency having the capability to communicate with an advisor.

The present invention advances the state of the art in vehicle emergency communications.

SUMMARY OF THE INVENTION

One form of the present invention is a system employing a telematics unit and a telematics call center. The telematics unit includes a first module and a first set of at least one pre-scripted text message, and the telematics call center includes a second module and a second set of at least one pre-scripted text message. The modules operate to selectively establish a communication between telematics unit and telematics call center involving at least one of the first set of at least one pre-scripted text message and the second set of at least one pre-scripted text message.

Another aspect of the invention provides a method of communicating between a telematics unit in a vehicle and a call center. The method includes determining whether the telematics unit is in a pre-scripted text message mode and providing a pre-scripted text message mode interface based on the determination.

Yet another aspect of the invention provides a system for communicating between a telematics unit in a vehicle and a call center. The system includes means for determining whether the telematics unit is in a pre-scripted text message mode and means for providing a pre-scripted text message mode interface based on the determination. The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 illustrates exemplary embodiments of pre-scripted text messages;

DETAILED DESCRIPTION OF THE DRAWINGS

Figure 1:
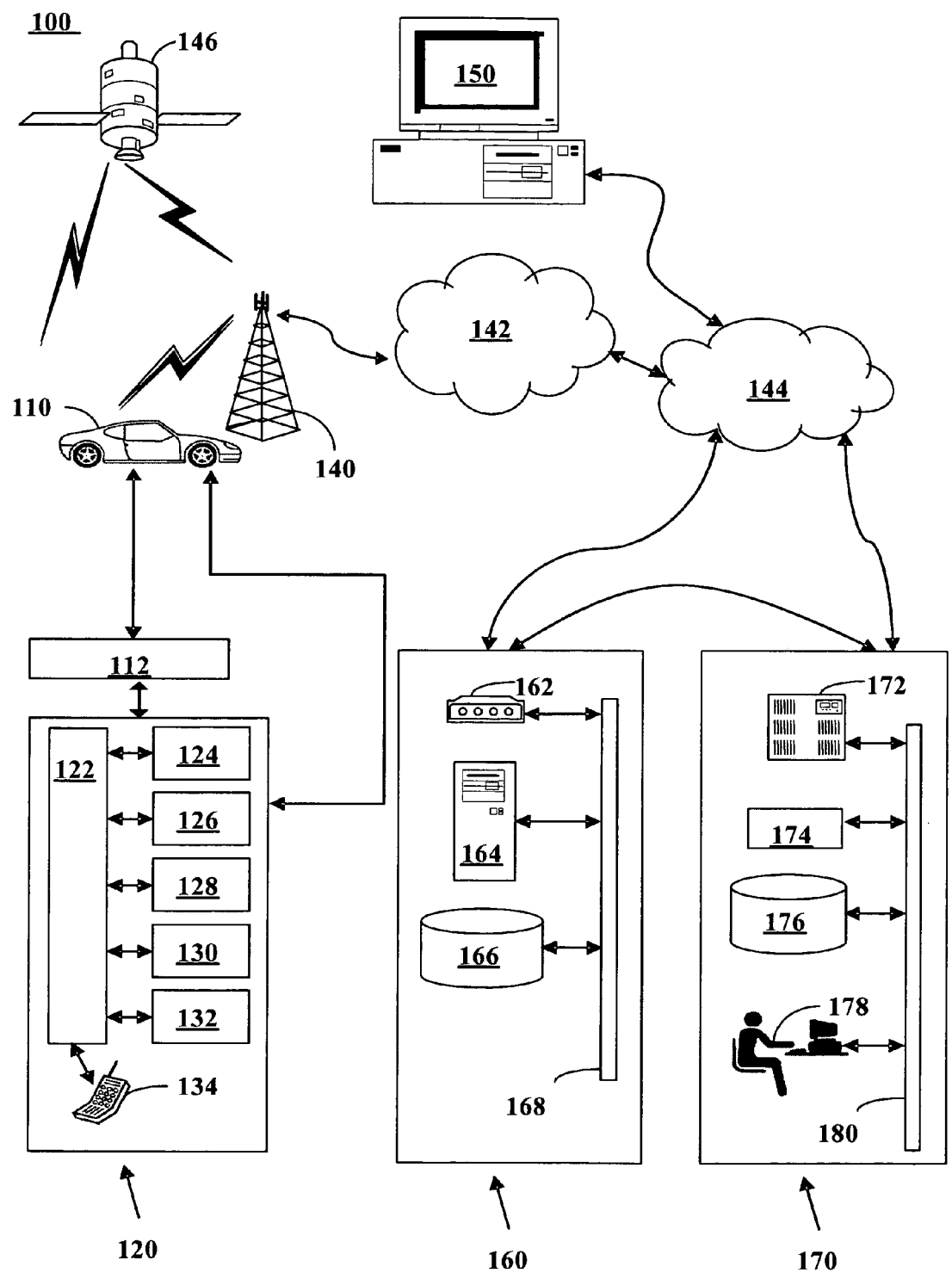
FIG. 1 illustrates an operating environment for a system for controlling vehicle modules as known in the art.

FIG. 1 illustrates one embodiment of a mobile vehicle communication system ("MVCS") 100 for controlling vehicle modules. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS")

unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol, and transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
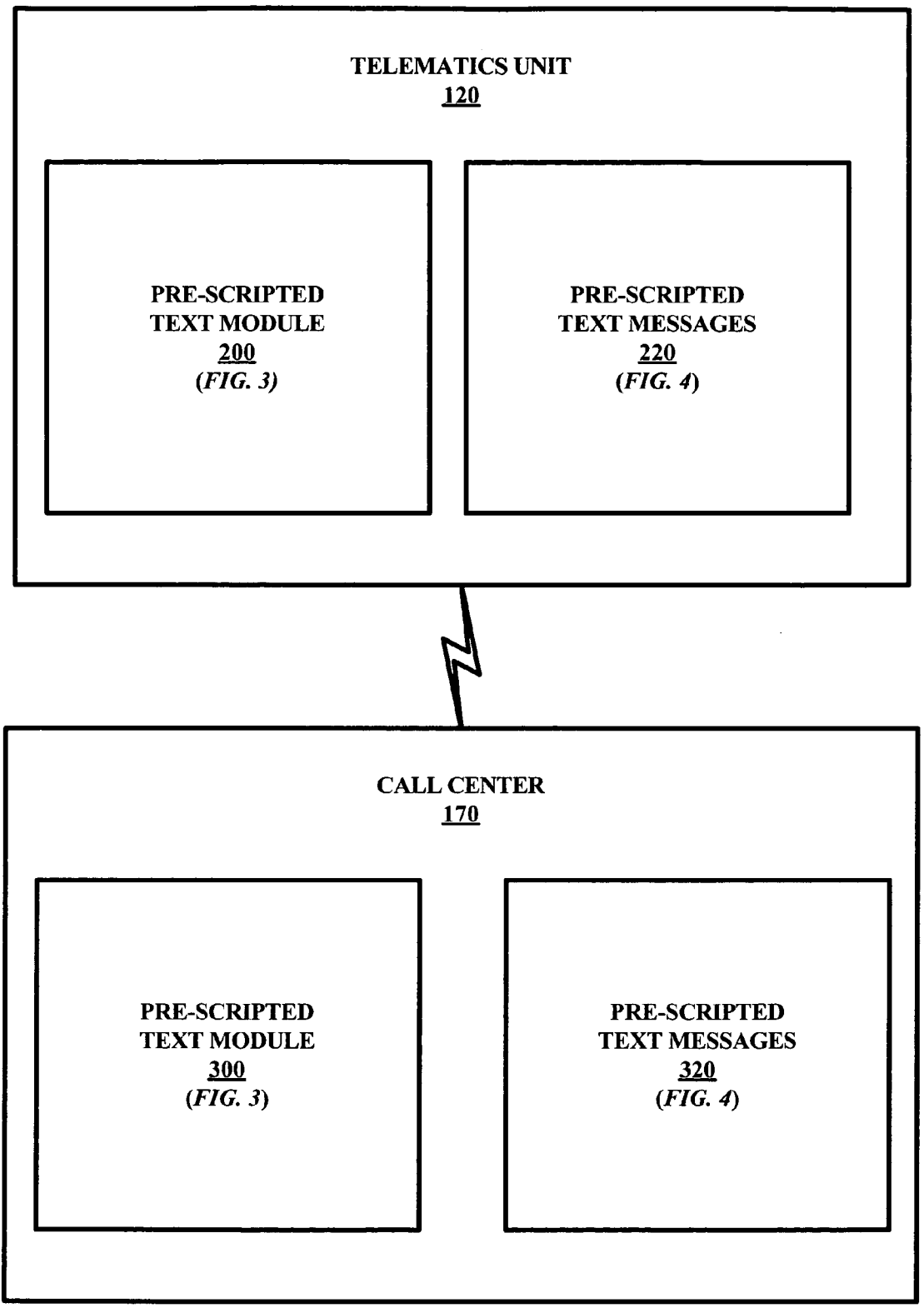
FIG. 2 illustrates a block diagram of one embodiment of a pre-scripted text message system in accordance with the present invention.

FIG. 2 illustrates a pre-scripted text message system employing a pre-scripted text module 200 and pre-scripted text messages 220 stored within telematics unit 120 (FIG. 1), and a pre-scripted text module 300 and pre-scripted text messages 320 stored within call center 170 (FIG. 1). Module 200 and module 300 are structurally configured with hardware, software, firmware or any combination thereof to implement a pre-scripted text message method as represented by flowcharts 210 and 310 illustrated in FIG. 3. Any communication of one or more text messages between telematics unit 120 and call center 170 during an implementation of flowchart 210 and flowchart 310 by module 200 and module 300, respectively, can be based on a conventional communication protocols and formats, such as, for example, SMS, GSM, CDMA, AMPS, 802.11 (all versions), and any other FCC Part 15 protocol.

Figure 3:
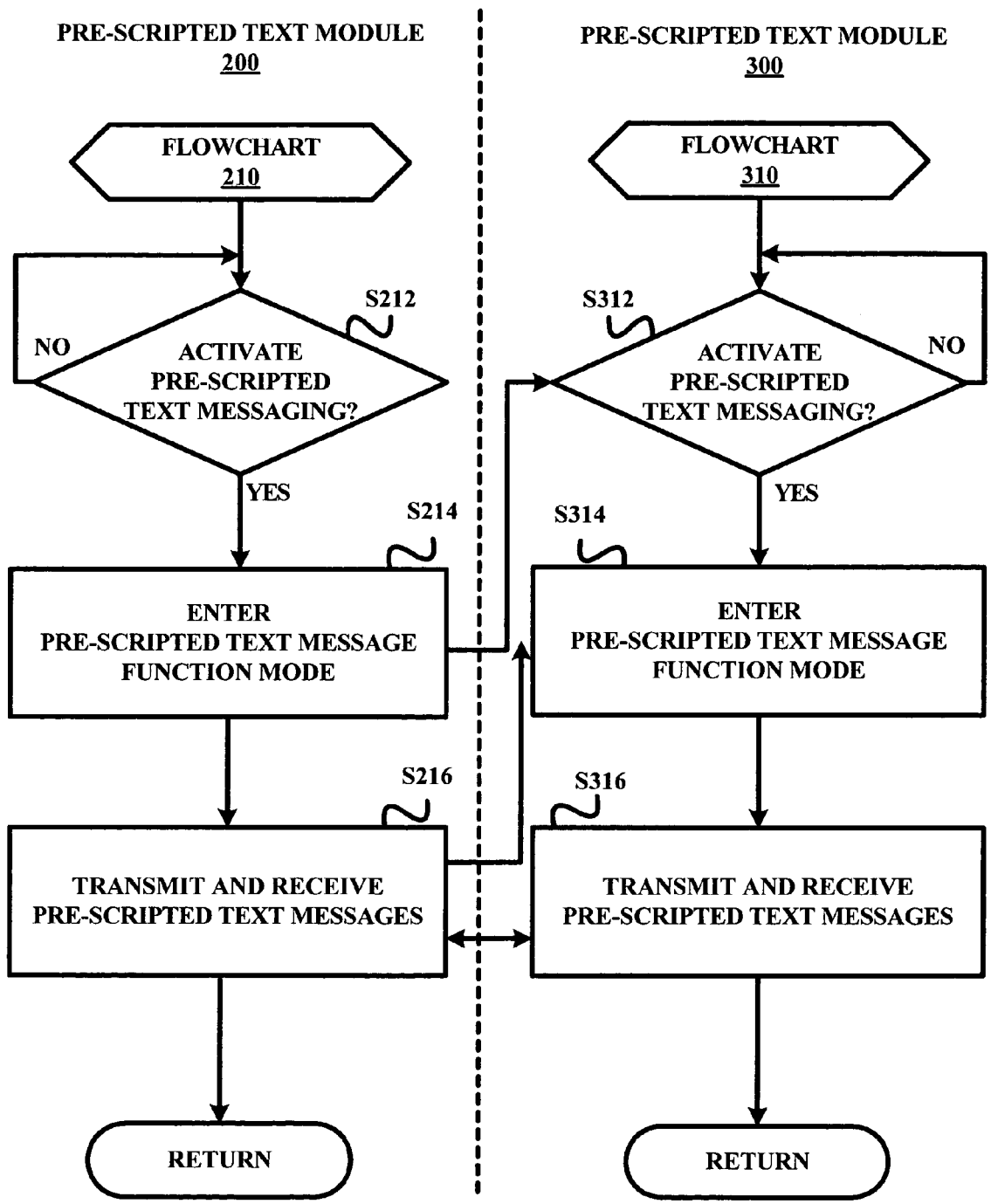
FIG. 3 illustrates flow charts representative of one embodiment of a pre-scripted text message method in accordance with the present invention.

Referring to FIG. 3, module 200 is active during a stage S212 of flowchart 210 in determining whether to activate pre-scripted text messaging for telematics units 120. In one embodiment, module 200 proceeds to a stage S214 of flowchart 210 to enter telematics unit 120 into the pre-scripted text message function mode in response to an activation command from vehicle 110 (FIG. 1) or mobile phone 134 (FIG. 1). In a second embodiment, module 200 performs an impedance test of audio lines of microphone 130, speaker 132, and phone 134 whereby module 200 proceeds to stage S214 of flowchart 210 to enter telematics unit 120 into the pre-scripted text message function mode via diagnostic trouble code upon a failure of one or more of the audio lines.

Upon initially entering the pre-scripted text message function mode during stage S214, module 200 displays messages 220 (e.g., exemplary pre-text messages 220 illustrated in FIG. 4) on a navigation screen within vehicle 110 and/or a display screen of phone 134. In one embodiment, module 200 can also communicate an entering of telematics unit 120 into the pre-scripted text message function mode to call center 170. Thereafter, module 200 proceeds to stage S216 of flowchart 210 to transmit one or more messages 220 to call center 170 and/or to receive one or more messages 320 from call center 170. In a second embodiment, module 200 a transmission of a first message 220 to call center 170 is an indication that telematics units 120 has entered into the pre-scripted text message function mode to call center 170.

Module 300 is passive during a stage S312 of flowchart 310 in determining whether to activate pre-scripted text messaging for call center 170. In one embodiment, module 300 proceeds to a stage S314 of flowchart 310 to enter call center 170 into a pre-scripted text message function mode upon receiving notification that telematics unit 120 has been entered into a pre-scripted text message function mode. In a second embodiment, module 300 proceeds to stage S314 of flowchart 310 to enter call center 170 into a pre-scripted text message function mode upon an initial receipt of a message 220 from telematics units 120.

Upon initially entering the pre-scripted text message function mode during stage S314, module 300 displays the received message 220 as well as messages 320 (e.g., exemplary pre-text messages 320 illustrated in FIG. 4) on an advisor screen for a real advisor 178 (FIG. 1) or maps the received message 220 as well as messages 320 for a virtual advisor 178. Thereafter, module 300 proceeds to stage S316 of flowchart 310 to transmit one or more messages 320 to telematics unit 120 and/or to receive additional messages 220 from telematics unit 120.

Module 200 and module 300 will thereafter collectively execute stages S216 and S316, respectively, until such time modules 200 and 300 are reset. Both flowchart 210 and 310 return to stage S210 and S310, respectively, upon a resetting of modules 200 and 300.

Figure 5:
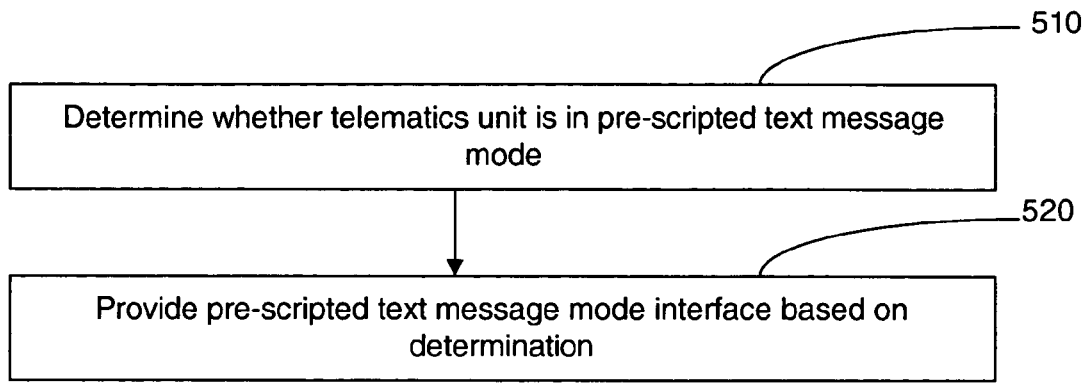
FIG. 5 illustrates one embodiment of a method to communicate between a telematics unit and a call center, in accordance with the invention.

FIG. 5 illustrates one embodiment of a method 500 for communicating between a telematics unit and a call center in accordance with one aspect of the invention. Method 500 begins at step 510 by determining whether the telematics unit is in a pre-scripted text message mode. Determining whether the telematics unit is in a pre-scripted text message mode is described in further detail with reference to FIGS. 8 and 9. At step 520, method 500 provides a pre-scripted text message mode interface based on the determination. Providing a pre-scripted text message mode interface is described in further detail with reference to FIG. 10.

Figure 6:
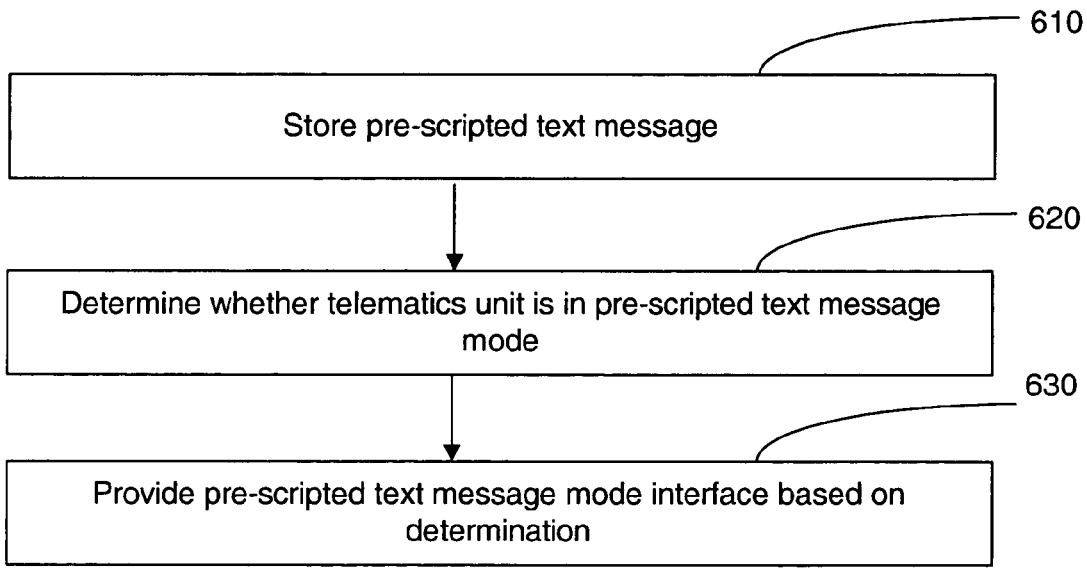
FIG. 6 illustrates one embodiment of a method to communicate between a telematics unit and a call center, in accordance with the invention.

FIG. 6 illustrates one embodiment of a method 600 for communicating between a telematics unit and a call center in accord with one aspect of the invention. Method 600 begins at step 610 by storing a pre-scripted text message. In one embodiment, the pre-scripted text message is stored in the telematics unit (e.g. 120 of FIG. 1). In another embodiment, the pre-scripted text message is stored at the call center (e.g. 170 of FIG. 1). The pre-scripted text message may be any predetermined message, such as, for example, the messages described in FIG. 4.

At step 620, the method determines whether the telematics unit is in a pre-scripted text message mode. Determining whether the telematics unit is in a pre-scripted text message mode is described in further detail with reference to FIGS. 8 and 9. At step 630, method 600 provides a pre-scripted text message mode interface based on the determination. Providing a pre-scripted text message mode interface is described in further detail with reference to FIG. 10.

Figure 7:
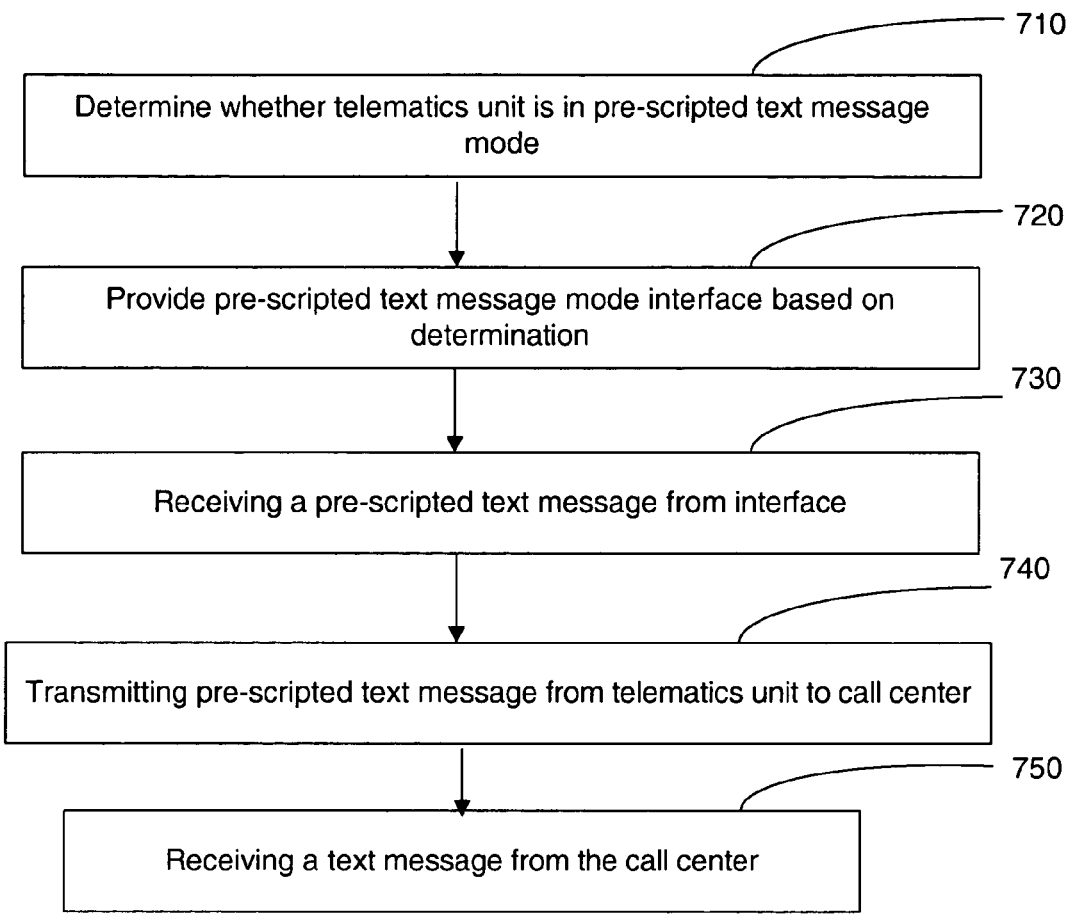
FIG. 7 illustrates one embodiment of a method to communicate between a telematics unit and a call center, in accordance with the invention.

FIG. 7 illustrates one embodiment of a method 700 for communicating between a telematics unit and a call center in accord with one aspect of the invention. At step 710, the method determines whether the telematics unit is in a pre-scripted text message mode, as further described in FIGS. 8 and 9. At step 720, a pre-scripted text message mode interface is provided based on the determination, as described in further detail with reference to FIG. 10.

At step 730, a pre-scripted text message is received from the pre-scripted text message mode interface. In one embodiment, the pre-scripted text message is received at the telematics unit, such as telematics unit 120 of FIG. 1. The pre-scripted text message is received in response to, for example, a button push on the pre-scripted text message mode interface.

At step 740, the received pre-scripted text message is transmitted from the telematics unit to the call center (e.g. call center 170 of FIG. 1). The pre-scripted text message is transmitted over a wireless network, such as wireless carrier system 140 of FIG. 1. The pre-scripted text message transmission may be accomplished using any known communication protocol. In one embodiment, the communication protocol is a FCC Part 15 protocol, such as, for example, 802.11, Bluetooth, GSM, CDMA, etc.

At step 750, a text message is received from the call center at the telematics unit in response to the transmitted pre-scripted text message. The text message from the call center is displayed using the pre-scripted text message mode interface, in one embodiment. The text message from the call center may be either a form response generated automatically, or a customized response prepared by an advisor (e.g. advisor 178 of FIG. 1). The pre-scripted text message transmission may be accomplished using any known communication protocol. In one embodiment, the communication protocol is a FCC Part 15 protocol, such as, for example, 802.11, Bluetooth, GSM, CDMA, etc.

Figure 8:
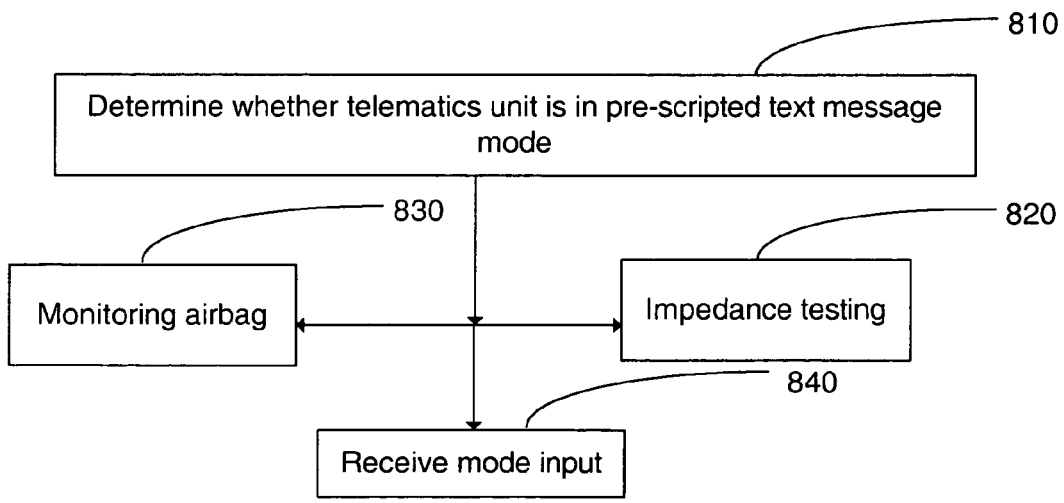
FIG. 8 illustrates one embodiment of a method to communicate between a telematics unit and a call center, in accordance with the invention.

FIG. 8 is a flowchart illustrating one embodiment of method 800 to determine whether a telematics unit is in a pre-scripted text message mode, in accordance with one aspect of the invention. At step 810, the method determines whether the telematics is in a pre-scripted text message mode. After initiating the determination, the method consults several factors.

In one embodiment, illustrated at 820, the method tests the impedance of at least one circuit to determine if the electronics are performing other than as designed. In the case of an abnormal result, i.e. the electronic circuit is not functioning properly as illustrated by an impedance reading other than as expected, the telematics unit shifts into a pre-scripted text message mode. In one embodiment, the circuit is an audio circuit, such as, for example, a circuit controlling a microphone configured to receive sound from inside the vehicle (e.g. vehicle 110 of FIG. 1) cabin.

In one embodiment, illustrated at 830, an airbag is monitored to determine an airbag deployment status. In the event that an airbag has been deployed, the telematics unit enters a pre-scripted text message mode.

In one embodiment, illustrated at 840, a mode input is received. A mode input is any deliberate input to deliberately enter into a pre-scripted text message mode. In one embodiment, a mode input in an emergency mode input to alert the call center to an emergency wherein the user does not desire to speak or communicate with the call center audibly. An emergency mode input, in one embodiment, comprises an emergency button press. In another embodiment, a mode input sets the telematics unit in a pre-scripted text message mode until changed. Such a setting may be desirable for persons who have difficulty communicating orally or listening to oral communications, or merely prefer reading to speaking.

In executing method 800, any of the steps 820, 830, 840 may be included in the method, or any combination of the steps. A combination of steps may be executed in any order.

Figure 9:
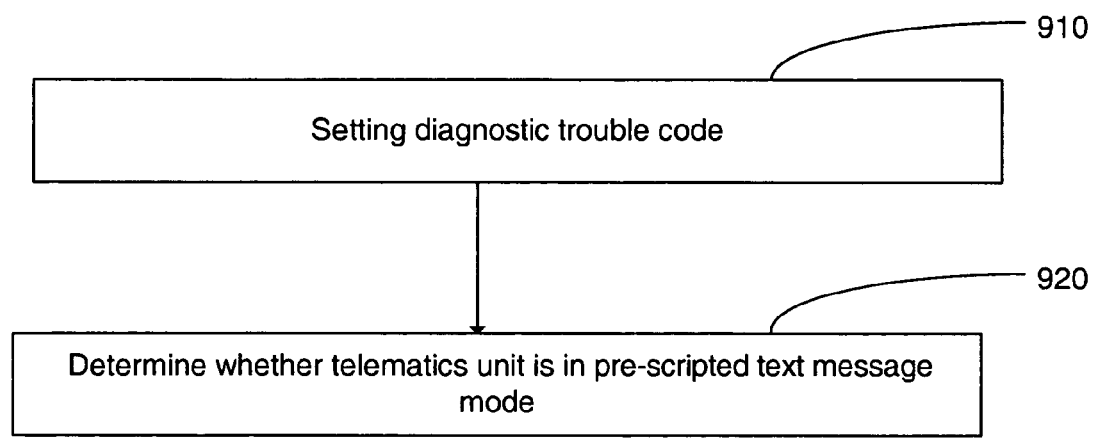
FIG. 9 illustrates one embodiment of a method to communicate between a telematics unit and a call center, in accordance with the invention.

FIG. 9 is a flowchart illustrating one embodiment of method 900 to determine whether a telematics unit is in a pre-scripted text message mode, in accordance with one aspect of the invention.

At step 910, a Diagnostic Trouble Code ("DTC") is set, indicating that the telematics unit has entered a pre-scripted text message mode. In one embodiment, the DTC is stored in the telematics unit. In another embodiment, the DTC is transmitted, via a wireless network (e.g. 140 of FIG. 1), to the call center. The DTC may be transmitted, in such an embodiment, to the call center either upon entry into pre-scripted text message mode, or at a later time during a data transfer session. In one embodiment, the DTC is set in response to an equipment event, such as in the event that a microphone does not operate as expected.

At step 920, method 900 determines whether the telematics unit is in a pre-scripted text message mode in response to the set DTC. In one embodiment, method 900 continues with the method as outlined in FIG. 6.

Figure 10:
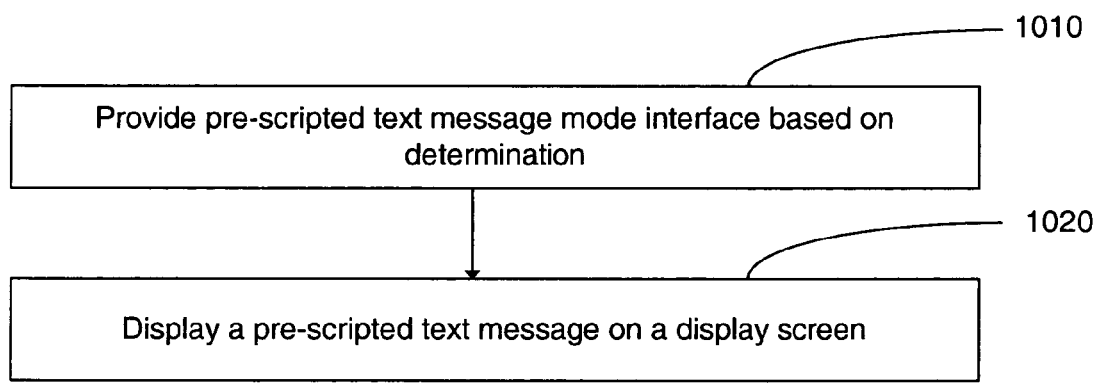
FIG. 10 illustrates one embodiment of a method to communicate between a telematics unit and a call center, in accordance with the invention.

FIG. 10 illustrates a flowchart illustrating one embodiment of method 1000 to provide a pre-scripted text message mode interface, in accordance with one aspect of the invention. At step 1010, the pre-scripted text message mode interface is provided. At step 1020, the pre-scripted text message mode interface is displayed on a display screen. A display screen may be any device configured to show a perceptible image. For example, the display screen, in one embodiment, is a monitor. In another embodiment, the display screen is a navigation screen. In another embodiment, the display screen is a radio display unit. In one embodiment, the display screen includes a touch sensitive screen. In another embodiment, the display screen is a driver information display. In another embodiment, the display screen includes buttons or other input devices configured to control pre-scripted text messages.

The present invention may be embodied in other specific forms without departing from its spirit or essential characteristics. The described embodiments are to be considered in all respects only as illustrative and not restrictive.

What is claimed is:

1. A system, comprising:
   a telematics unit including a first module and a first set of pre-scripted text messages; and
   a telematics call center including a second module and a second set of pre-scripted text messages;
   wherein the first module and the second module are operable to selectively establish a communication between the telematics unit and the telematics call center; and
   wherein the first module is also operable to:
      enter into a pre-scripted text message mode in response to at least one of:
         failure of an impedance test of at least one audio circuit,
         deployment of an airbag, or
         receipt of an emergency mode input;
      provide a plurality of the pre-scripted text messages to a user via a pre-scripted text message mode interface;
      receive a user selection of one of the plurality of pre-scripted text messages via the pre-scripted text message mode interface; and
      transmit the selected pre-scripted text message between the telematics unit and call center.

2. The system of claim 1, wherein the communication is based on at least one of a communication protocol selected from the group consisting of SMS, CDMA, AMPS, SDARS, GSM, PCS, Bluetooth, 802.11, and a FCC Part 15 protocol.

3. The system of claim 1, wherein the first module is additionally operable to control a communication of a first pre-scripted text message from the telematics unit to the telematics call center in response to an activation command from at least one of a vehicle and a mobile phone.

4. A method of communicating between a telematics unit in a vehicle and a call center, the method comprising:
   entering a pre-scripted text message mode in response to at least one of:
      failure of an impedance test of at least one audio circuit,
      deployment of an airbag, or
      receipt of an emergency mode input;
   providing a plurality of pre-scripted text messages via a pre-scripted text message mode interface upon entering the pre-scripted text message mode;
   receiving a user selection of one of the plurality of pre-scripted text messages via the pre-scripted text message mode interface; and
   transmitting the selected pre-scripted text message from the telematics unit to the call center.

5. The method of claim 4 further comprising storing at least one of the pre-scripted text messages in the telematics unit.

6. The method of claim 4 wherein the receipt of an emergency mode input comprises the step of receiving an emergency mode button press.

7. The method of claim 4 further comprising receiving a pre-scripted text message from the call center in response to the transmitted pre-scripted text message.

8. The method of claim 4 wherein providing a plurality of pre-scripted text messages via a pre-scripted text message mode interface comprises displaying the plurality of pre-scripted text messages on a display screen.

9. The method of claim 8 wherein the display screen is selected from the group consisting of a navigation screen, monitor, driver information display, and a radio display unit.

10. The method of claim 4 further comprising setting a diagnostic trouble code.

11. A system for communicating between a call center and a telematics unit, the system comprising:
   means for entering a pre-scripted text message mode in response to at least one of:
      failure of an impedance test of at least one audio circuit,
      deployment of an airbag, or
      receipt of an emergency mode input; and
   means for providing a plurality of pre-scripted text messages via a pre-scripted text message mode interface upon entering the pre-scripted text message mode;
   means for receiving a user selection of one of the plurality of pre-scripted text messages via the pre-scripted text message mode interface; and
   means for transmitting the selected pre-scripted text message from the telematics unit to the call center.

* * * * *